United States Patent
Rox et al.

(10) Patent No.: US 11,968,060 B2
(45) Date of Patent: Apr. 23, 2024

(54) DATA SWITCHING DEVICE AND DATA SWITCHING METHOD FOR A VEHICLE, DEVICE AND METHOD FOR A VEHICLE COMPONENT OF A VEHICLE, AND COMPUTER PROGRAM

(71) Applicant: Volkswagen Aktiengesellschaft, Wolfsburg (DE)

(72) Inventors: Jonas Rox, Leiferde (DE); Razvan Racu, Braunschweig (DE); Johann Heyen, Braunschweig (DE); Steffen Stein, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 499 days.

(21) Appl. No.: 17/292,148

(22) PCT Filed: Oct. 15, 2019

(86) PCT No.: PCT/EP2019/077979
§ 371 (c)(1),
(2) Date: May 7, 2021

(87) PCT Pub. No.: WO2020/094346
PCT Pub. Date: May 14, 2020

(65) Prior Publication Data
US 2021/0399916 A1 Dec. 23, 2021

(30) Foreign Application Priority Data
Nov. 7, 2018 (DE) ...................... 10 2018 218 927.7

(51) Int. Cl.
*H04L 12/40* (2006.01)
*H04L 9/40* (2022.01)
*H04L 12/46* (2006.01)

(52) U.S. Cl.
CPC ........ *H04L 12/40* (2013.01); *H04L 12/40039* (2013.01); *H04L 12/46* (2013.01);
(Continued)

(58) Field of Classification Search
CPC ... H04L 12/40; H04L 12/40039; H04L 12/46; H04L 2012/40215; H04L 2012/40273
(Continued)

(56) References Cited

U.S. PATENT DOCUMENTS

| 6,738,696 B2 | 5/2004 | Oi ................................ 701/29.6 |
| 8,705,527 B1 | 4/2014 | Addepalli et al. ............ 370/389 |

(Continued)

FOREIGN PATENT DOCUMENTS

| CN | 102227727 A | 10/2011 | ............. G06F 17/30 |
| CN | 107113903 A | 8/2017 | ............. H04W 4/14 |

(Continued)

OTHER PUBLICATIONS

Korean Office Action, Application No. 2021097695847, 10 pages, dated Dec. 13, 2021.
(Continued)

*Primary Examiner* — Erick R Solis
(74) *Attorney, Agent, or Firm* — Slayden Grubert Beard PLLC

(57) ABSTRACT

A data switching device comprises at least one interface designed to communicate with a first plurality of vehicle components of the vehicle, and to communicate with a second plurality of vehicle components of the vehicle. The data switching device includes a control circuit designed to communicate with the first plurality of vehicle components based on at least one first data format, and with the second plurality of vehicle components based on at least one second data format. The control circuit is designed to provide a communication interface for the communication between
(Continued)

the first plurality of vehicle components and the second plurality of vehicle components. The control circuit is designed to provide access to the first data of the first plurality of vehicle components by providing second data for the second plurality of vehicle components.

14 Claims, 10 Drawing Sheets

(52) U.S. Cl.
CPC .... *H04L 63/04* (2013.01); *H04L 2012/40215* (2013.01); *H04L 2012/40273* (2013.01)

(58) Field of Classification Search
USPC .............................................. 701/36, 45, 48
See application file for complete search history.

(56) References Cited

U.S. PATENT DOCUMENTS

| | | | |
|---|---|---|---|
| 10,002,036 B2 | 6/2018 | Fuchs et al. | |
| 10,020,916 B2 | 7/2018 | Park et al. | |
| 10,091,278 B1 | 10/2018 | Garlapati et al. | |
| 10,687,233 B2 | 6/2020 | Simsek et al. | |
| 2004/0039646 A1 | 2/2004 | Hacker | 705/22 |
| 2004/0167689 A1 | 8/2004 | Bromley et al. | 701/29.6 |
| 2004/0176935 A1 | 9/2004 | Sproule et al. | 703/8 |
| 2009/0005916 A1 | 1/2009 | Wainwright et al. | 701/3 |
| 2009/0225766 A1 | 9/2009 | Ihle et al. | 370/402 |
| 2011/0282889 A1 | 11/2011 | Gerstberger et al. | 707/756 |
| 2012/0316726 A1 | 12/2012 | Schroeck et al. | 701/32.7 |
| 2013/0219039 A1 | 8/2013 | Ricci | 709/223 |
| 2013/0297630 A1 | 11/2013 | Desanzo et al. | 707/756 |
| 2018/0034912 A1 | 2/2018 | Binder et al. | |
| 2023/0344673 A1* | 10/2023 | Thirumaleshwara | H04L 12/40195 |

FOREIGN PATENT DOCUMENTS

| | | | | |
|---|---|---|---|---|
| CN | 107948193 A | 4/2018 | | H04L 29/06 |
| DE | 102007001137 A1 | 8/2007 | | H04L 29/02 |
| DE | 102018218927 A1 | 5/2020 | | H04L 12/66 |
| JP | 2002178854 A | 6/2002 | | B60R 16/02 |
| JP | 2013201510 A | 10/2013 | | B60R 16/023 |
| KR | 101714227 B1 | 3/2017 | | H04L 12/40 |
| WO | 2020/094346 A1 | 5/2020 | | H04L 29/06 |

OTHER PUBLICATIONS

German Office Action, Application No. 102018218927.7, 8 pages, dated Nov. 18, 2019.
International Search Report and Written Opinion, Application No. PCT/EP2019/077979, 27 pages, dated Jan. 20, 2020.
Chinese Office Action, Application No. 201980088196.5, 25 pages, dated Nov. 28, 2023.

* cited by examiner

| 530 | 532 | 534 | 536 | 538 | 540 | 542 | 544 |
|---|---|---|---|---|---|---|---|
| Service | Version | Service ID | Resource | Resource ID | Property | Type | Object1 |
| Exterior Light | 0.1.0 | 0x6001 | lightFunctions | 0x001 | id | uuid | |
| | | | | | functionIdentifier | enum | 1=ParkingLights |
| | | | | | isActivated | boolean | LV_Standlicht_Anzeige |

FIG. 5c

| 530 | 532 | 534 | 536 | 538 | 540 | 542 | 544 |
|---|---|---|---|---|---|---|---|
| Service | Version | Service ID | Resource | Resource ID | Property | Type | Object1 |
| Emergency Assist | 0.1.0 | 0x6016 | notifications | 0x001 | id | uuid | |
| | | | | | type | enum | 1=EmergencyAssistNotification |
| | | | | | value | integer | EA_Texte |

FIG. 5d

| 530 | 532 | 534 | 536 | 538 | 540 | 542 | 544 |
|---|---|---|---|---|---|---|---|
| Service | Version | Service ID | Resource | Resource ID | Property | Type | Object1 |
| Emergency Assist | 0.1.0 | 0x6016 | notifications | 0x001 | id | uuid | |
| | | | | | type | enum | 1=EmergencyAssistNotification |
| | | | | | value | integer | EA_Texte |
| | | | | | valueType | enum [0=init,1=error, 2=logicalValue, 3=physicalValue] | |

FIG. 5e

| 530 | 532 | 534 | 536 | 538 | 540 | 542 | 544 |
|---|---|---|---|---|---|---|---|
| Emergency Assist | 0.1.0 | 0x6016 | notifications | | | | |
| | | | | 0x001 | id | uuid | |
| | | | | | type | enum | 1=EmergencyAssistNotification |
| | | | | | value | integer | EA_Texte |
| | | | | | valueType | enum [0=init,1=error, 2=logicalValue, 3=physicalValue] | EA_Texte |

FIG. 5f

| 530 | 532 | 534 | 536 | 538 | 540 | 542 | 544 |
|---|---|---|---|---|---|---|---|
| Odometrie V2 | | | velocities | | | | |
| | | | | | id | uuid | |
| | | | | | type | enum | 1=VelocityNCAP |
| | | | | | value | double | EML_AnzeigeGeschw |
| | | | | | value Type | enum [0=init,1=error, 2=logicalValue, 3=physicalValue] | EML_AnzeigeGeschw |

FIG. 5g

| Odometry V2 | 532 | 534 | velocities 536 | 538 | | | 544 |
|---|---|---|---|---|---|---|---|
| | | | | id | uuid | | |
| | | | | type | enum | | 1=VelocityNCAP |
| | | | | physicalValue | double | | EML_AnzeigeGeschw |
| | | | | logicalValue | integer | | EML_AnzeigeGeschw |
| | | | | valueType | enum [0=init,1=error, 2=logicalValue, 3=physicalValue] | | EML_AnzeigeGeschw |

DATA SWITCHING DEVICE AND DATA SWITCHING METHOD FOR A VEHICLE, DEVICE AND METHOD FOR A VEHICLE COMPONENT OF A VEHICLE, AND COMPUTER PROGRAM

CROSS-REFERENCE TO RELATED APPLICATIONS

This application claims priority to German Patent Application No. DE 10 2018 218 927.7, filed on Nov. 7, 2018 with the German Patent and Trademark Office. The contents of the aforesaid Patent Application are incorporated herein for all purposes.

TECHNICAL FIELD

The present invention relates to a data switching device and a data switching method for a vehicle, to a device and a method for a vehicle component of a vehicle, and to a computer program.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Vehicles generally include a plurality of vehicle components, sensors and actuators of the engine from the control for heating functions to infotainment systems (short for systems for information and entertainment). Since these vehicle components are generally not used in isolation but instead exchange data with each other, communication program protocols and networks have been created over many decades that serve to network the different vehicle components. For example, in many vehicles, the vehicle components are linked to each other by a star-shaped network architecture in which a central gateway is used to provide communication between various components. The communication between the vehicle components with actuators and sensors is chiefly based on hardware-related communication protocols which are optimized to take up as little transmission capacity as possible and as little processing capacity as possible. Since these components generally originate from suppliers, they moreover generally use a communication protocol that is compatible with a plurality of vehicle manufacturers, and that therefore frequently does not exhaust the possibilities of modern communication protocols. On the other hand, there are vehicle components such as infotainment systems that have powerful processors and are therefore able to handle more complex protocols that offer greater options.

SUMMARY

A need exists for an improved concept for communication within a vehicle, wherein both the capabilities of the less complex actuators and sensors as well as the capabilities of the vehicle components with powerful processors are taken into account.

The need is addressed by the subject matter of the independent claims. Embodiments of the invention are discussed in the dependent claims and the following description.

BRIEF DESCRIPTION OF THE DRAWINGS

FIGS. 5a to 5h show examples of data models of service-oriented communication; and FIG. 6 shows a schematic diagram of communication between vehicle components and a communication server.

DESCRIPTION

Figure 1A:
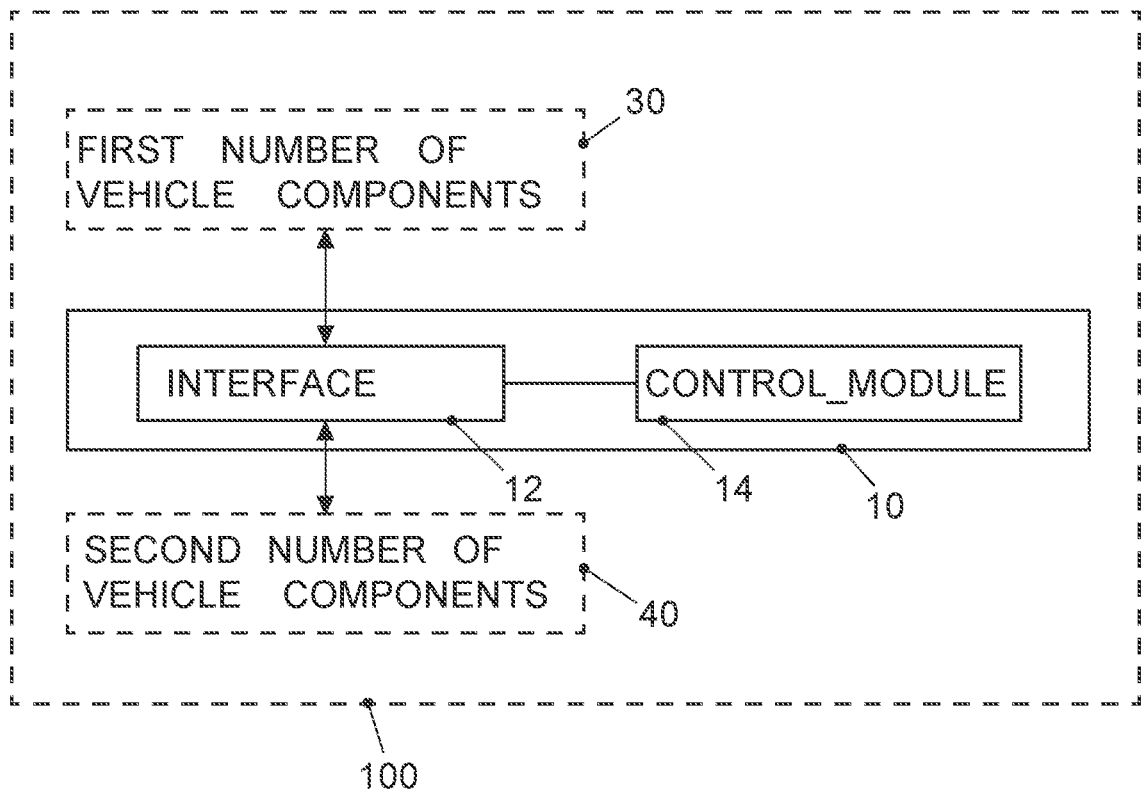
FIG. 1a shows a block diagram of an exemplary embodiment of a data switching device.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

Exemplary embodiments establish a data switching device for a vehicle. This data switching device may be used to provide switching between the "simpler" protocols (that are at least based on a first data format) of the actuators/sensors and the more complex protocols (that are at least based on a second data format). To accomplish this, in a simple form, the data switching device provides only one assignment of data equivalences between the at least one first data format and the at least one second data format. Optionally, i.e., in some embodiments, the data switching device provides a conversion between the two data formats, eliminates redundancies within the data, keeps the data ready for retrieval, or performs a transmission of indications of errors if data cannot be transmitted flawlessly.

Exemplary embodiments establish a data switching device for a vehicle. The device includes at least one interface designed to communicate with a first plurality of vehicle components of the vehicle, and to communicate with a second plurality of vehicle components of the vehicle. The device furthermore includes a control module designed to communicate with the first plurality of vehicle components of the vehicle based on at least one first data format, and with the second plurality of vehicle components of the vehicle based on at least one second data format. The control module is designed to provide a communication interface for communicating between the first plurality of vehicle components and the second plurality of vehicle components. The control module is designed to provide access to first data from the first plurality of vehicle components by providing second data for the second plurality of vehicle components, wherein the first data are based on the at least one first data format, and wherein the second data are based on the at least one second data format. By providing the communication interface, the second plurality of vehicle components that communicate based on the at least one second data format is enabled to use the data from the first plurality of vehicle components that communicate based on the at least one first data format, or to trigger functions. This allows the vehicle components of the second plurality of vehicle components to use more complex and more powerful protocols for communication without losing access to the first plurality of vehicle components.

In at least some exemplary embodiments, the control module is designed to provide a conversion between the at least one first data format and the at least one second data format for communication between the first plurality of vehicle components and the second plurality of vehicle components. This makes it possible to provide a universal communication interface for the second plurality of vehicle components independent of the data types and communication protocols based on which the first plurality of vehicle components communicates.

The control module may, e.g., furthermore be designed to eliminate at least one redundant datum in the first data of the first plurality of vehicle components. This enables uniform access to the data of the first plurality of vehicle components since, when accessed by several vehicle components of the second plurality, the data is always provided from the same source or sources.

In some exemplary embodiments, the control module is designed to provide end-to-end secured communication between a first vehicle component of the first plurality of vehicle components and a second vehicle component of the second plurality of vehicle components. In at least some implementations, this enables trustworthy communication between vehicle components of the first plurality and vehicle components of the second plurality of vehicle components.

For example, the control module may be designed to secure end-to-end secured communication by determining at least one transmission error, and/or forwarding information on the at least one transmission error. This may enable the vehicle components to recognize errors in the communication and to initiate troubleshooting measures despite communicating via the provided communication interface.

The control module may for example be designed to convert indications of errors in the communication of the first plurality of vehicle components based on the first data format into the second data format, and to provide them to the second plurality of vehicle components. The control module may be designed to convert indications of errors in the communication of the second plurality of vehicle components based on the second data format into the first data format, and to provide them to the first plurality of vehicle components. This may enable the vehicle components to recognize errors in the communication and to initiate troubleshooting measures despite communicating via the provided communication interface.

In some exemplary embodiments, at least one vehicle component can be included in the first plurality of vehicle components and in the second plurality of vehicle components. Accordingly for example, the data switching device may be used to provide auxiliary functions, such as the calculation of values used by several vehicle components, for a plurality of vehicle components.

The first plurality of vehicle components may for example correspond to a plurality of control units for actuating vehicle sensors and/or for actuating vehicle actuators. The second plurality of vehicle components may include a plurality of computing units of the vehicle. Accordingly for example, the data switching device may be used to provide to the computing units the data based on a plurality of data formats of the control units for actuating vehicle sensors or actuators.

In some exemplary embodiments, the control module is designed to provide the communication interface based on a configuration datum. The control module may furthermore be designed to receive an updated configuration datum to refresh the configuration datum. Accordingly for example when exchanging or updating a vehicle component (such as a vehicle component of the first plurality of vehicle components), only the configuration datum of the data switching device can be changed without an adaptation of the configuration of the second plurality of vehicle components being necessary.

The control module can be designed to continuously receive the first data of the first plurality of vehicle components from the first plurality of vehicle components in order to determine the second data based on the first data and provide it to the second plurality of vehicle components. This enables access to the second data with negligible delays.

The control module may be designed to continuously receive the first data of the first plurality of vehicle components from the first plurality of vehicle components. The control module may be designed to determine a timeout for receiving the first data of the first plurality of vehicle components. This may for example prevent a vehicle component of the first plurality from failing without it being recognized by a vehicle component of the second plurality since the data would still be provided.

In at least some exemplary embodiments, the control module is designed to provide the second data via an object-oriented programming interface for the second plurality of vehicle components. The second data format may be an object-oriented data format. This enables abstracted access to the first data for the second plurality of vehicle components.

Exemplary embodiments furthermore establish a device for a vehicle component of a vehicle. The device includes an interface designed to communicate with a data switching device of the vehicle. The device furthermore includes a control module that is designed to use the data switching device to access first data of a first plurality of vehicle components via the data switching device in the form of second data that are based on a second data format, wherein the first data are based on a first data format. This enables the vehicle component to access the data of the first plurality of vehicle components without having to master their data formats, which enables a flexible exchange between these vehicle components.

Exemplary embodiments furthermore establish a data switching method for a vehicle. The method includes communication with a first plurality of vehicle components of the vehicle based on at least one first data format. The method furthermore includes communication with a second plurality of vehicle components of the vehicle based on at least one second data format. The method furthermore includes providing a communication interface for the communication between the first plurality of vehicle components and the second plurality of vehicle components. Providing the communication interface includes providing access to first data of the first plurality of vehicle components by providing second data for the second plurality of vehicle components. The first data are based on the at least one first data format. The second data are based on the at least one second data format.

Exemplary embodiments furthermore establish a method for a vehicle component of a vehicle. The method includes communicating with a data switching device of the vehicle. The method furthermore includes using the data switching device to access first data of a first plurality of vehicle components via the data switching device in the form of second data that are based on a second data format, wherein the first data are based on a first data format.

Exemplary embodiments furthermore establish a program with a program code for performing at least one of the methods when the program code is run on a computer, a processor, a controller or a programmable hardware component.

Additional embodiments are described in greater detail below with reference to the exemplary embodiments shown in the drawings, to which exemplary embodiments are in general however not entirely restricted.

Various exemplary embodiments will now be described in greater detail with reference to the accompanying drawings in which a few exemplary embodiments are shown. In the FIGS., the dimensions of the thickness of the lines, layers and/or regions may be shown exaggerated for the sake of clarity.

In the following description of the accompanying FIGS. that only show a few exemplary embodiments, the same reference numerals may designate the same or comparable components. Furthermore, summary reference numerals may be used for components and objects that appear several times in an exemplary embodiment or in a drawing but that are jointly described with regard to one or more features. Components or objects that are described with the same or summary reference numerals may be designed the same but also perhaps differently with respect to an individual, several or all features, for example its dimensions, if not otherwise revealed explicitly or implicitly in the description.

Although exemplary embodiments may be modified and changed in different ways, exemplary embodiments are shown as examples in the FIGS. and will be described in detail in this context. It should, however, also be noted that it is not intended to restrict exemplary embodiments to the disclosed; rather, the exemplary embodiments are to cover all functional and/or structural modifications, equivalents and alternatives that lie within the scope of the present teachings. In the entire description of the FIGS., equivalent reference numerals refer to equivalent or similar elements.

It should be considered that an element that is designated as being "connected" or "coupled" to another element may be directly connected or coupled to the other element, or there may also be intermediate elements. If an element is designated as being "directly connected" or "directly coupled" to another element, there are no intermediate elements. Other terms that are used to describe the relationship between elements should be interpreted in a similar manner (for example "between" in comparison to "directly between", "adjacent" in comparison to "directly adjacent", etc.).

The terminology that is used herein only serves to describe certain exemplary embodiments and should not restrict the exemplary embodiments. As used herein, the singular forms "a" "of a" and "the" should also include the plural form as long as the context does not clearly indicate otherwise. It is further noted that the expressions such as "contains", "containing", "has", "includes", "comprising" and/or "having" as used herein indicate the presence of the mentioned features, whole numbers, steps, work processes, elements and/or components, but does not exclude the presence or addition of one or more features, whole numbers, steps, work processes, elements, components and/or groups.

If not otherwise defined, all terms used herein (including technical and scientific terms) have the same meaning that an average person skilled in the art in the field to which the exemplary embodiments belong would attribute to them. It should further be noted that expressions such as those that are defined in generally used dictionaries should be interpreted as if they had the meaning that is consistent with their meaning in the context of the relevant field and are not to be interpreted in an idealized or excessively formal sense as long as this is not expressly defined herein.

FIG. 1a shows a block diagram of a data switching device 10 for a vehicle 100. FIG. 1a furthermore shows the vehicle 100 with the data switching device 10, a first plurality of vehicle components 30, and a second plurality of vehicle components 40. The data switching device 10 includes at least one interface 12 designed to communicate with the first plurality of vehicle components 30 of the vehicle 100, and to communicate with the second plurality of vehicle components 40 of the vehicle 100. The data switching device furthermore includes a control module 14 designed to communicate with the first plurality of vehicle components of the vehicle based on at least one first data format, and with the second plurality of vehicle components of the vehicle based on at least one second data format. The control module 14 is designed to provide a communication interface for the communication between the first plurality of vehicle components and the second plurality of vehicle components. The control module 14 is designed to provide access to the first data of the first plurality of vehicle components by providing second data for the second plurality of vehicle components. The first data are based on the at least one first data format. The second data are based on the at least one second data format. The at least one interface is coupled to the control module 14.

Figure 1B:
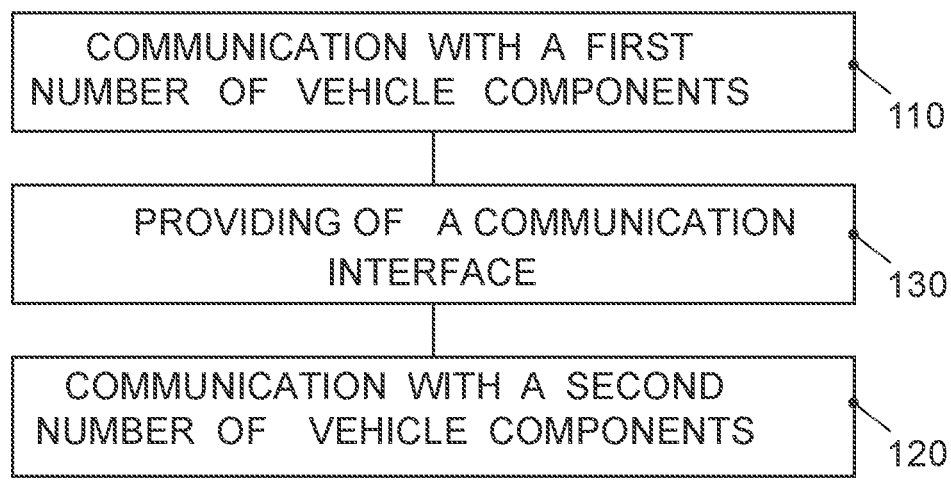
FIG. 1b shows a flowchart of an exemplary embodiment of a data switching method.

FIG. 1b shows a flowchart of a (corresponding) data switching method for a vehicle 100. The data switching method includes communication 110 with a first plurality of vehicle components of the vehicle based on at least one first data format. The data switching method includes communication 120 with a second plurality of vehicle components of the vehicle based on at least one second data format. The data switching method includes providing 130 a communication interface for the communication between the first plurality of vehicle components and the second plurality of vehicle components. Providing 130 the communication interface includes providing access to first data of the first plurality of vehicle components by providing second data for the second plurality of vehicle components. The method may for example be executed by the data switching device, and/or by a computing unit of the vehicle.

The following description refers both to the data switching device as well as to the data switching method. Functional capabilities of the control module and the at least one interface correspond to the method steps of the data switching method.

Exemplary embodiments are based on using the data switching device to provide (simplified) communication between the first plurality and the second plurality of vehicle components. The data switching device 10 is designed to provide a transformation of the first data that are present in the first data format into the second data format, such as by assigning the content of the first data in the first data format to the second data format, and/or by converting the content of the first data in the first data format into the second data format. The data switching device may for example correspond to a vehicle data switching device. The method steps of the data switching method may be executed by a vehicle data switching device (within the vehicle).

The control module 14 is designed to communicate via the at least one interface 12 with the first plurality and with the second plurality of vehicle components. To do this, the at least one interface 12 may for example be designed to communicate via the same communication network, such as via an Ethernet, with the first plurality of vehicle components, and with the second plurality of vehicle components. For example, the communication of the control module 14 and/or the interface 12 with the first and the second plurality of vehicle components may be based on the same communication network, such as an Ethernet-based network. Alternatively, the at least one interface 12 may be designed to communicate via different communication networks with the first plurality of vehicle components and with the second plurality of vehicle components, such as via at least one communication network with the first plurality of vehicle components, and via a second communication network with the second plurality of vehicle components. The at least one first communication network can for example correspond to a controller area network bus (CAN bus) and/or a local interconnect network (LIN). The second communication network can for example correspond to an Ethernet-based network.

The first plurality of vehicle components may for example correspond to a plurality of control units for actuating vehicle sensors and/or for actuating vehicle actuators. For example, the first plurality of control units may correspond to a plurality of microchips that are designed to provide control and/or communication for only one vehicle component. For example, the first plurality of vehicle components may include a plurality of control units, such as of a drive system of the vehicle, or correspond thereto. The plurality of control units can for example have a lesser computing capacity than a plurality of computing units of the vehicle 100 which may correspond to the second plurality of vehicle components of the vehicle.

For example, the second plurality of vehicle components can include a plurality of computing units of the vehicle 100. The second plurality of vehicle components may for example be software-based vehicle components of the vehicle, such as control units or vehicle functionalities that are collectively executed on the plurality of computing units of the vehicle 100. For example, the second plurality of vehicle components can be the computing units, or the software-based vehicle components that are executed by the computing units. In at least some exemplary embodiments, the first plurality of vehicle components is implemented by dedicated application-specific microchips, and the second plurality of vehicle components is implemented by software that is designed to be executed by a central computing unit of the vehicle. In some exemplary embodiments, at least one vehicle component may be included in the first plurality of vehicle components and in the second plurality of vehicle components. Accordingly for example, a software-based vehicle component can be included in the first plurality of vehicle components in order to provide auxiliary functions for other vehicle components of the second plurality of vehicle components as well as in the second plurality of vehicle components in order to be able to use first data of the first plurality of vehicle components.

The control module is designed to communicate with the first plurality of vehicle components based on the at least one first data format, and with the second plurality of vehicle components based on the at least one second data format. The first data are based on the at least one first data format. The second data are based on the at least one second data format. For example, the first data format may result in a smaller message size than the second data format. For example, the first data format can be based on the fact that the data to be transmitted have a fixed arrangement, such as a fixed bit position, within the data format. Accordingly, data that are transmitted using the first data format may use data types that are large enough for the data to be transmitted, but do not correspond to a multiple of 8 or 16 bits: If only 64 different values are provided, for example only 6 bits can be provided for some data. In contrast, the at least one second data format may be based on data types that are based on a multiple of 8 bits (or 16 bits or 32 bits). For example, all data types of the at least one second data format may have a multiple of 8 bits. Such data types may for example be the data types of integer (whole number), float and double (floating-point numbers with a precision of 32 bits (float) or respectively 64 bits (double)), enum (enumeration type) or Boolean (binary data type with the values of true or false). For example, the second data format may be an object-oriented data format. The second data format may be based on structured text data, for example implemented similar to the extensible markup language (XML) or JavaScript object notation (JSON). In at least some exemplary embodiments, communication via the first data format corresponds to signal communication, and communication via the second data format corresponds to service-oriented communication. In at least some exemplary embodiments, the second data format is based on the SomeIP (scalable service-oriented middleware over IP), or the ViWi (Volkswagen infotainment web interface) protocol.

The control module 14 is designed to provide the communication interface for the communication between the first plurality of vehicle components and the second plurality of vehicle components. The communication interface may for example be designed to provide the second data for the second plurality of vehicle components for retrieval, and/or to (proactively) transmit the second data of the second plurality of vehicle components. The control module 14 may be designed to continuously (such as periodically or event-based) obtain the first data of the first plurality of vehicle components from the first plurality of vehicle components (for example to receive or call) in order to determine the second data based on the first data and provide them to the second plurality of vehicle components. The communication interface may be designed to retrieve the first data (periodically or event-based) from the first plurality of vehicle components, or to receive the first data from the first plurality of vehicle components, once the first plurality of vehicle components provides the first data. In at least some embodiments, the control module 14 is furthermore designed to buffer the first data and/or the second data, for example in a memory module. The data switching device can for example include the memory module.

In at least some exemplary embodiments, the control module 14 can furthermore be designed to continuously (such as periodically or event-based) obtain the first data of the first plurality of vehicle components from the first plurality of vehicle components (for example to receive or call), wherein the control module 14 is designed to determine a timeout for obtaining the first data of the first plurality of vehicle components. For example, the control module 14 may be designed to provide an error notification and/or an indication of an error for the second plurality of vehicle components if a timeout was determined for obtaining the first data of the first plurality of vehicle components. Alternatively or in addition, the control module 14 may be designed to output an error value or a null value when providing the second datum that corresponds to the first datum if the timeout for obtaining the first data of the first plurality of vehicle components was determined.

In at least some exemplary embodiments, the second data are based on the first data. For example, content of the second data may correspond to content of the first data or be based on the content of the first data. The second data can correspond to a processed, e.g., sorted, filtered and/or converted, version of the first data. For example, the control module 14 may be designed to provide the second data via an object-oriented programming interface for the second plurality of vehicle components. For example, the control module 14 may be designed to provide the content and/or functionalities of the first data by providing the second data via the object-oriented programming interface of the second plurality of vehicle components. In doing so, content may for example represent values such as sensor values or status data of the first plurality of vehicle components, and functionalities may represent the option of triggering a functionality of the vehicle component of the first plurality of vehicle components. For example, the second data may be configured to provide content of the first data via query access functions (also accessor methods), and to provide an access to functionalities of the first plurality of vehicle components via object methods.

In at least some exemplary embodiments, the control module 14 is furthermore designed to provide a conversion between the at least one first data format and the at least one second data format for communication between the first plurality of vehicle components and the second plurality of vehicle components. For example, the control module 14 may be designed to provide a conversion between data types of the at least one first data format and data types of the at least one second data format. The control module 14 may be designed to provide a conversion between a refresh rate of the first data format and a refresh rate of the second data format. In at least some exemplary embodiments, the control module 14 can be configured to provide a conversion between event-based communication and periodic communication (and vice versa) between the first data format and the second data format. In at least some exemplary embodiments, the at least one first data format and the at least one second data format are different.

For example, the control module 14 can furthermore be designed to eliminate at least one redundant datum in the first data of the first plurality of vehicle components. For example, the control module 14 may be configured to determine a datum of the second data based on at least two redundant data of the first data, for example based on a selection of the datum from the two redundant data, based on an average, combined value or an interpolated value of the two redundant data, or based on another conversion of the two redundant data.

In some exemplary embodiments, the control module is designed to provide end-to-end secured communication between a first vehicle component of the first plurality of vehicle components and a second vehicle component of the second plurality of the vehicle components. For example, the securing of the communication may refer to a recognition of transmission errors. The control module 14 may be configured to communicate and/or forward transmission errors in communication between the first vehicle component and the second vehicle component of the first and/or the second vehicle component. The control module 14 can for example be designed to secure end-to-end secured communication by determining at least one transmission error, and or forwarding information on the at least one transmission error. The transmission errors may then be communicated, transmitted or displayed to the first and/or the second vehicle component. For example, the control module 14 may be designed to convert indications of errors in communication of the first plurality of vehicle components based on the first data format into the second data format, and to provide them to the second plurality of vehicle components. The control module 14 may be designed to convert indications of errors in communication of the second plurality of vehicle components based on the second data format into the first data format, and to provide them to the first plurality of vehicle components.

The control module 14 may be designed to provide the communication interface based on a configuration datum. For example, the configuration datum can include at least one element from the group of data on a (mutual) correspondence of data of the first data with data of the second data, conversion rules for converting between the at least one first data format and the at least one second data format, rules on eliminating the at least one redundancy, and rules on determining transmission errors. The control module 14 may be designed to receive an updated configuration datum to refresh the configuration datum. The control module 14 may, after refreshing the configuration datum, be designed to provide the communication interface based on the updated configuration datum.

Figure 2A:
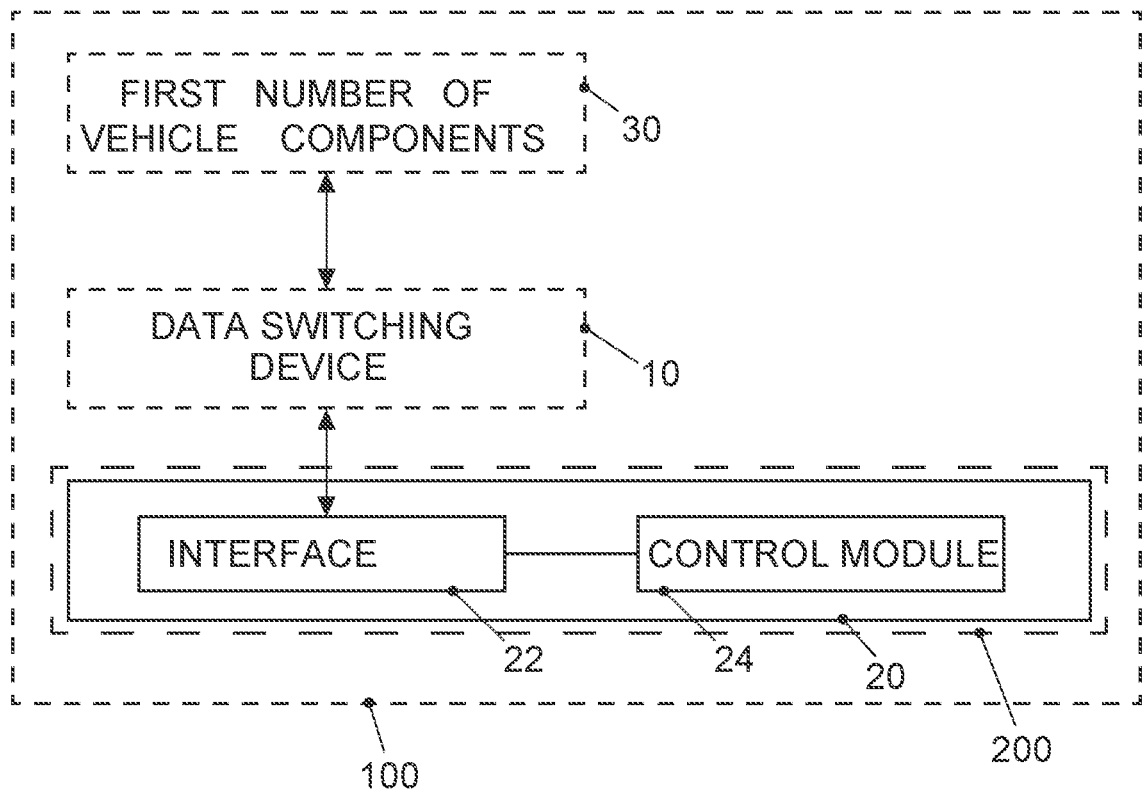
FIG. 2a shows a exemplary block diagram of a device for a vehicle component.
Figure 2B:
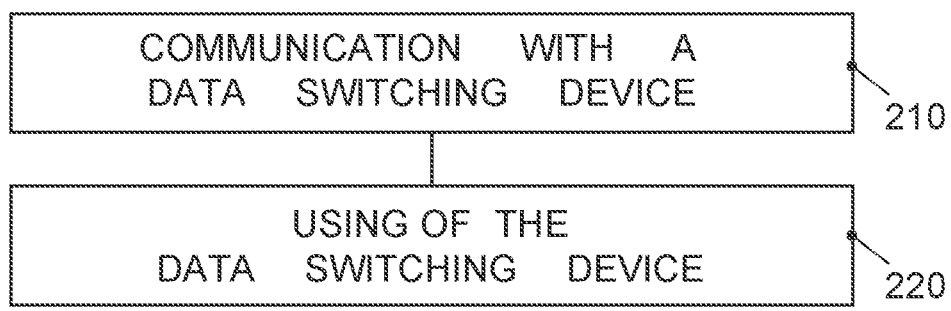
FIG. 2b shows a flowchart of an exemplary embodiment of a method for a vehicle component.

In exemplary embodiments, the control module 14 (and/or a control module 24 as introduced in conjunction with FIG. 2*a*) may correspond to any controller or processor, or a programmable hardware component. For example, the control module 14; 24 can also be realized as software that is programmed for a corresponding hardware component. The control module 14; 24 may therefore be implemented as programmable hardware with correspondingly adapted software. In this context, any processors such as digital signal processors (DSPs) may be used. Exemplary embodiments are not restricted to a specific type of processor in this context. Any processors or also any several processors are conceivable for implementing the control module 14; 24.

The at least one interface 12 (and/or at least one interface 22 as introduced in conjunction with FIG. 2*a*) may for example correspond to one or more inputs and/or one or more outputs for receiving and/or transmitting data, for example in digital bit values, based on a code, within a module, between modules, or between modules of different entities. The at least one interface 12; 22 may be designed to communicate via a vehicle-internal network. The communication between the first plurality of vehicle components, the data switching device and/or the second plurality of vehicle components may occur internally in the vehicle.

In at least some exemplary embodiments, the vehicle 100 may for example correspond to a land vehicle, a watercraft, an airplane, a rail vehicle, a road vehicle, an automobile, an ATV, a motor vehicle or a truck.

The memory module may for example include at least one element from the group of computer readable storage medium, magnetic storage medium, optical storage medium, hard disk, flash memory, diskette, random-access memory programmable read-only memory (PROM), erasable programmable read-only memory (EPROM), electronically erasable programmable read-only memory (EEPROM), and network memory.

More details and aspects of the data switching device 10 and/or the data switching method will be mentioned in conjunction with the approach or examples that are described above or below (such as FIGS. 2a to 6). The data switching device 10 and/or the data switching method may include one or more additional optional features which correspond to one or more aspects of the proposed approach or the described examples as described above or below.

FIG. 2a shows a block diagram of an exemplary embodiment of a device 20 for a vehicle component 200 of a vehicle 100. FIG. 2a furthermore shows the vehicle component 200 with the device 20, and the vehicle 100 with the vehicle component 200 with the device 20, with the data switching device 10 and with the first plurality of vehicle components. The device 20 includes an interface 22 designed to communicate with a data switching device 10 of the vehicle 100. The data switching device 10 may for example correspond to the data switching device as introduced in conjunction with FIG. 1a. The vehicle component may for example be a vehicle component of the second plurality of vehicle components. The device 20 furthermore includes a control module 24 that is designed to use the data switching device 10 to access first data of a first plurality of vehicle components via the data switching device 10 in the form of second data that are based on a second data format, wherein the first data are based on a first data format. The at least one interface 22 is coupled to the control module 24.

FIG. 2a shows a flowchart of an exemplary embodiment of a corresponding method for the vehicle components of the vehicle. The method steps may for example be executed by the vehicle component, for example by a control module of the vehicle component. The method includes communication 210 with a data switching device 10 of the vehicle 100. The method furthermore includes using 220 the data switching device 10 to access first data of a first plurality of vehicle components via the data switching device 10 in the form of second data that are based on a second data format, wherein the first data are based on a first data format. The method may for example be executed by the vehicle component, such as by a control module of the vehicle component.

The following description refers both to the device as well as to the method. Functional capabilities of the control module and the at least one interface correspond to the steps of the method.

The control module 24 is designed to use the data switching device 10 to access first data of a first plurality of vehicle components via the data switching device 10 in the form of second data. For example, the control module 24 may be designed to call the second data from the data switching device 10, or to receive the second data from the data switching device 10. The control module 24 may be designed to extract the first data from the second data, or to derive the first data from the second data. For example, the second data may include the content of the first data and/or provide a functionality of the first data. The control module may be designed to access the content and/or the functionality of the first data via the second data.

More details and aspects of the device 20 and/or the method will be mentioned in conjunction with the approach or examples that are described above or below (such as FIGS. 1a to 2a and 3a to 6). The device 20 and/or the method may include one or more additional optional features which correspond to one or more aspects of the proposed approach or the described examples as described above or below.

At least some exemplary embodiments establish a communication server. The communication server and the communication servers that will be presented below may for example correspond to or include the data switching device 10 as introduced in conjunction with FIG. 1a to 2b. Exemplary embodiments of the communication server provide a transformation of signal-based communication to service-oriented communication in a distributed automotive E/E architecture (end-to-end architecture in the automotive field).

In some systems, a gateway in the vehicle provides functions to the data of the vehicle network via static interfaces. This may have the disadvantage that the data are statically fixed and there is no abstraction of the vehicle network from the functional level. This may be disadvantageous for an update/upgradability and mobility of functions.

Exemplary embodiments therefore provide an in-car application server (ICAS, application server in the vehicle) with a communication server that prepares static CAN signals as a service, by means of which functions (applications) may be dynamically accessed, and that may use different functions via service discovery (service recognition in the network).

Exemplary embodiments pursue a generic approach in this context that is application-independent. The communication server which for example may correspond to the data switching device may provide service communication from several signal sources (physical buses/networks and communication protocols) and vice versa. At least some exemplary embodiments of the communication server use multi-protocol service-oriented communication. The communication server may be designed to breakdown/convert binary data ("typeless") (such as the first data format) to full-fledged data structures (type-based, such as the second data format). The communication server may be designed to monitor the communication on both sides. The communication server may be designed to transform time-controlled into event-controlled communication and vice versa. The communication server may be designed to secure the communication according to ISO26262 (standard of the International Standardization Organization, ISO).

The communication server (ComServ) may be designed to switch between signal communication as used on the sensor/actuator level and service-oriented communication as used on the MEB (modular electrification toolkit) computing level.

The ComServ may provide services (as a server) via which information can be called, or respectively subscribed from the signal communication (such as the communication that is based on the second data format), and/or data can be sent to participants by signal communication.

The ComServ may use other services as a client (as the calling computer) to call data and send them as signals, and/or to transmit data from signals to services (servers).

Figure 3A:
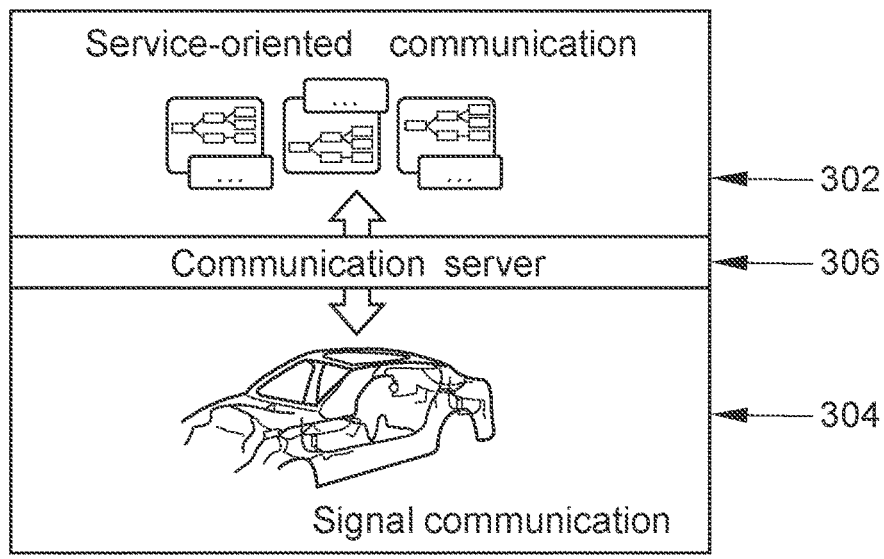
FIGS. 3a to 3c show exemplary schematic diagrams of communication between vehicle components of a vehicle.

FIG. 3a shows a schematic diagram of a communication in a vehicle with service-oriented communication between vehicle applications 302 (such as the second plurality of vehicle components) and a signal communication between vehicle sensors/actuators 304 (such as the first plurality of vehicle components). The communication server 306 provides a communication interface between the signal communication and the service-oriented communication.

Figure 3B:
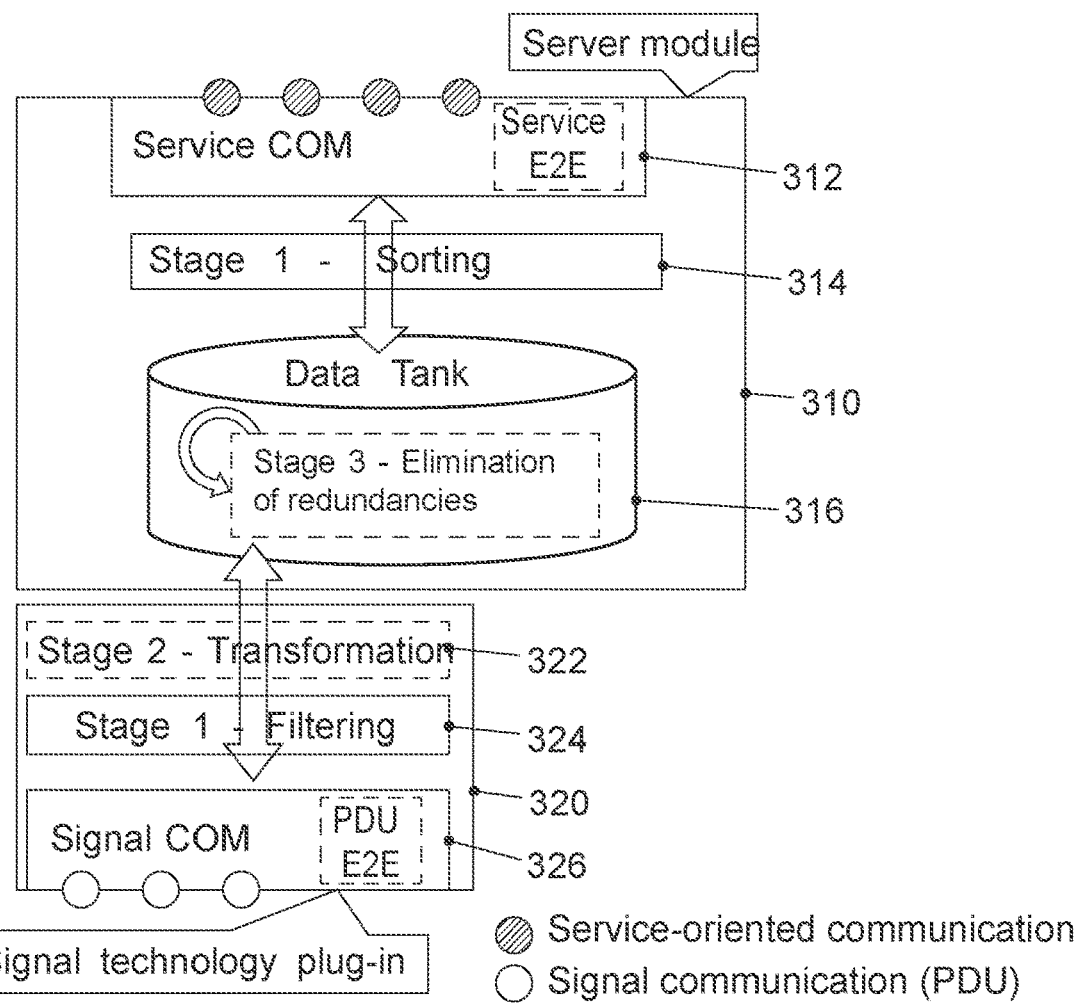

FIG. 3b shows a functional architecture of an example of a communication server. The communication server may for example include a server module 310 and a signal technology plug-in (additional component) 320. The server module may for example be used for different signal technologies. The server module provides protocol-dependent service behavior (for example via the SomeIP or ViWi protocols). The server module furthermore optionally provides a transformation of redundant data (as a generic artifact) and/or an E2E transformer (end-to-end transformer for providing the end-to-end secured communication).

In this context, the server module includes a service communication interface 312 that communicates by service-oriented communication (such as the second data format) and that may optionally include a service interface for the end-to-end secured communication. In a first stage 314, the data can be sorted between a data tank 316 and the communication interface 312. In stage 3 in the data tank 316, redundancies may furthermore be optionally eliminated.

The signal technology plug-in 320 includes a signal communication interface 324 which communicates by signal communication (PDU, payload data unit), and that optionally may include a PDU interface for the end-to-end secured communication. The signal technology plug-in 320 furthermore includes the stages 1—filtering 324 to filter the signal communication, and optionally the stage 2—transformation 322 to convert the signal communication into a data format of service communication. The signal technology plug-in may for example provide communication monitoring, a mapping (assignment) of signals to service elements (generic artifact analogous to a routing matrix) and/or an E2E transformer (end-to-end transformer for providing the end-to-end secured communication).

At least some exemplary embodiments of the communication server support the protocols SOME/IP and ViWi. The communication server can maintain the requirement to support a maximum data age of 2 ms of the signal change to the service (and vice versa), and to provide the services after a maximum of 200 ms as the maximum starting time.

Up to 1 MB of data can be offered by the communication server. At least some exemplary embodiments support the security specifications of the systems OBD (on-board diagnosis) and ASIL D (automotive safety integrity level D). At least some exemplary embodiments of the communication server furthermore support updatability. An update may for example not have any influence on other applications on ICAS1.

Figure 3C:
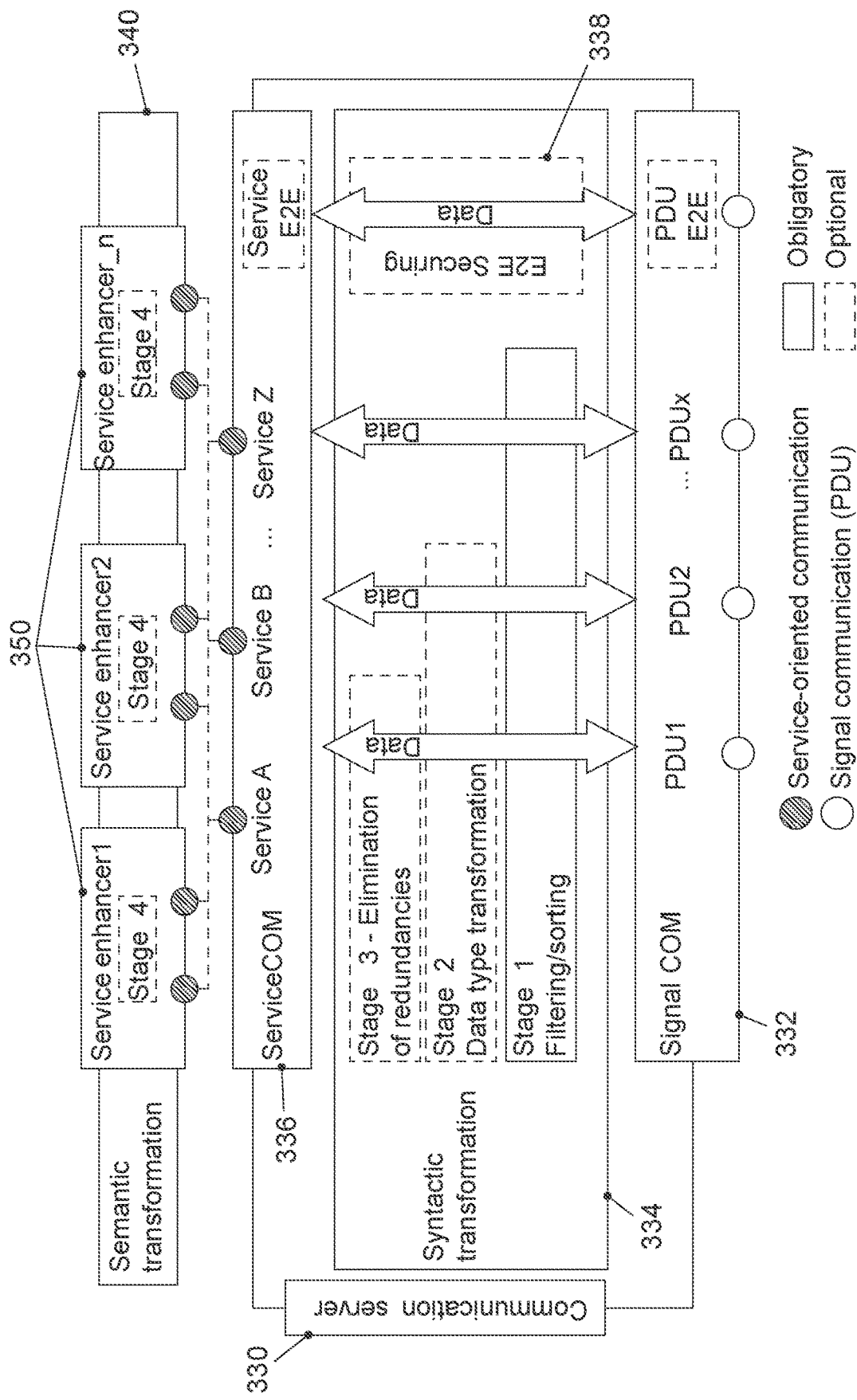

The communication server provides a transformation of the data between the sensor/actuator and computing level. FIG. 3c illustrates such a transformation. Signal communication reaches a communication server 330 via a signal communication interface 332. The communication server is designed to provide syntactic transformation 334 between signal communication and service-oriented communication. This includes the stage 1 (filtering/sorting) and the optional stages 2 (data type transformation) and 3 (eliminating redundancies). Service-oriented communication is then provided in the context of several services of a number of service enhancers (such as the second plurality of vehicle components) 350 via a service communication interface 336 that optionally undertakes a semantic transformation 340 which represents stage 4. Furthermore, the communication server optionally provides end-to-end securing 338 between signal communication interface 332 and service communication interface 336. The at least one interface 12 that is introduced in conjunction with FIG. 1a may for example include the signal communication interface 332 and the service communication interface 336.

Figure 4:
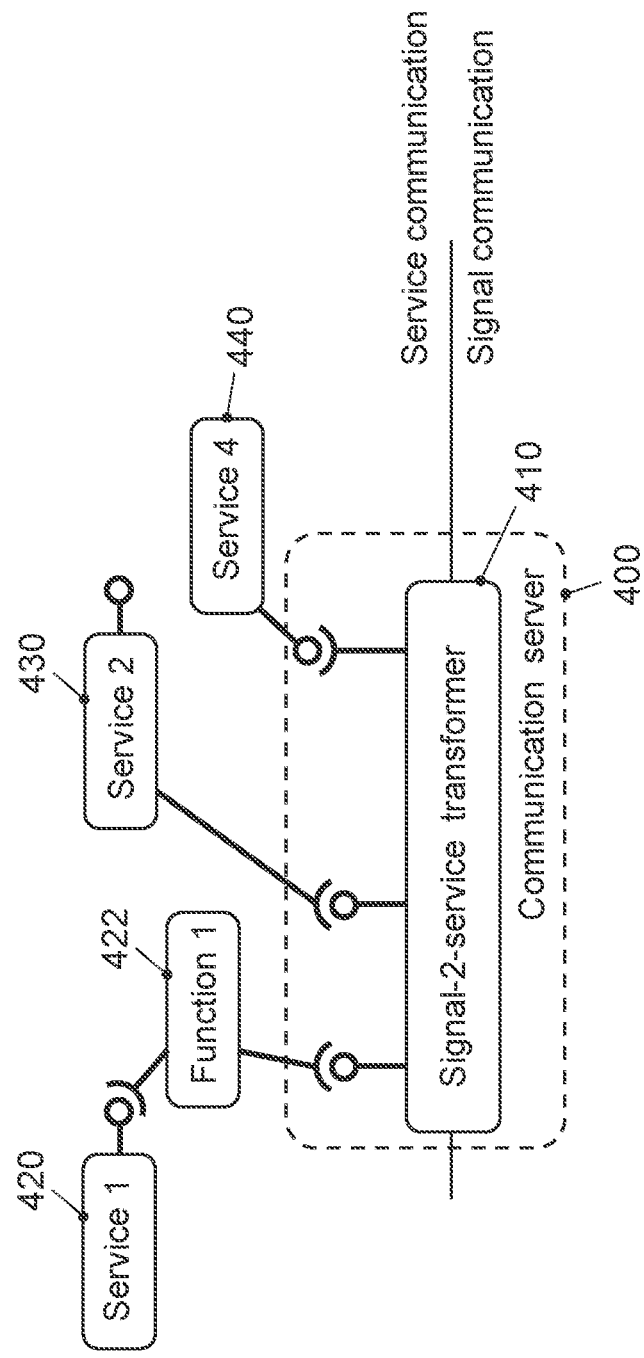
FIG. 4 shows a system overview of an example of a communication server.

FIG. 4 shows a system overview of an example of a communication server 400. The communication server includes a signal-to-service transformer 410 that provides an assignment and optionally a conversion between signal communication and service communication. Services 1 420, 2 430 and 4 440 access the communication server using service communication, for example based on a pull paradigm by calling data (service 2, service 1 via function 1 422), or based on a push paradigm by receiving data provided by the communication server 400 (service 4).

The communication server maps for example a sender/receiver interface from the signal world to service interfaces, offers for example service interfaces (servers) for receiving information from the signal world, and/or functions for example as a server/client to send information to the signal world.

The communication server comprises a signal-2-service transformer (such as the data switching device 10).

Figure 5A:
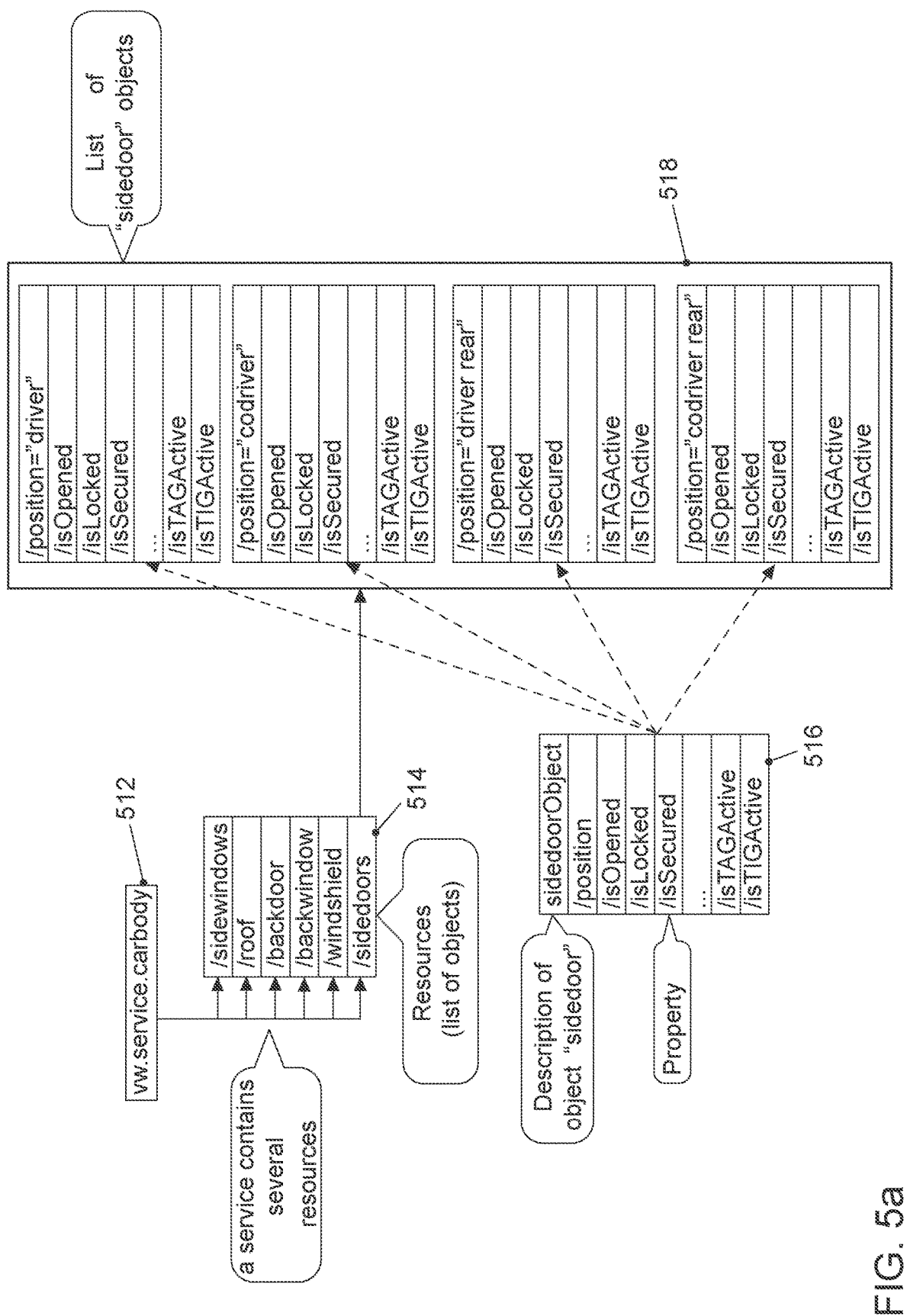

FIG. 5a shows an example of a service data model (that for example is based on the second data format). A service 512 includes several resources 514 that can be represented as objects. In the present case, the service "vw.service.carbody" ("vw" and "service" serve as manufacturer and protocol-specific prefixes, and "carbody" is the service identifier), the resources 514 "sidewindows", "roof", "backdoor", "backwindow", "windshield" and "sidedoors" are the resources of the service. The resource "sidedoors" is defined by the object "sidedoor" 516 that is described by the properties "position", "isOpened", "isLocked", isSecured, . . . , "isTAGActive" and "isTIGActive". This "sidedoor" object is used by the resource "sidedoors" in four instances 518 for the "sidedoor" objects with the positions "driver", "codriver", "driver rear" and "codriver rear" to provide access to the "sidedoor" resource.

Figure 5B:
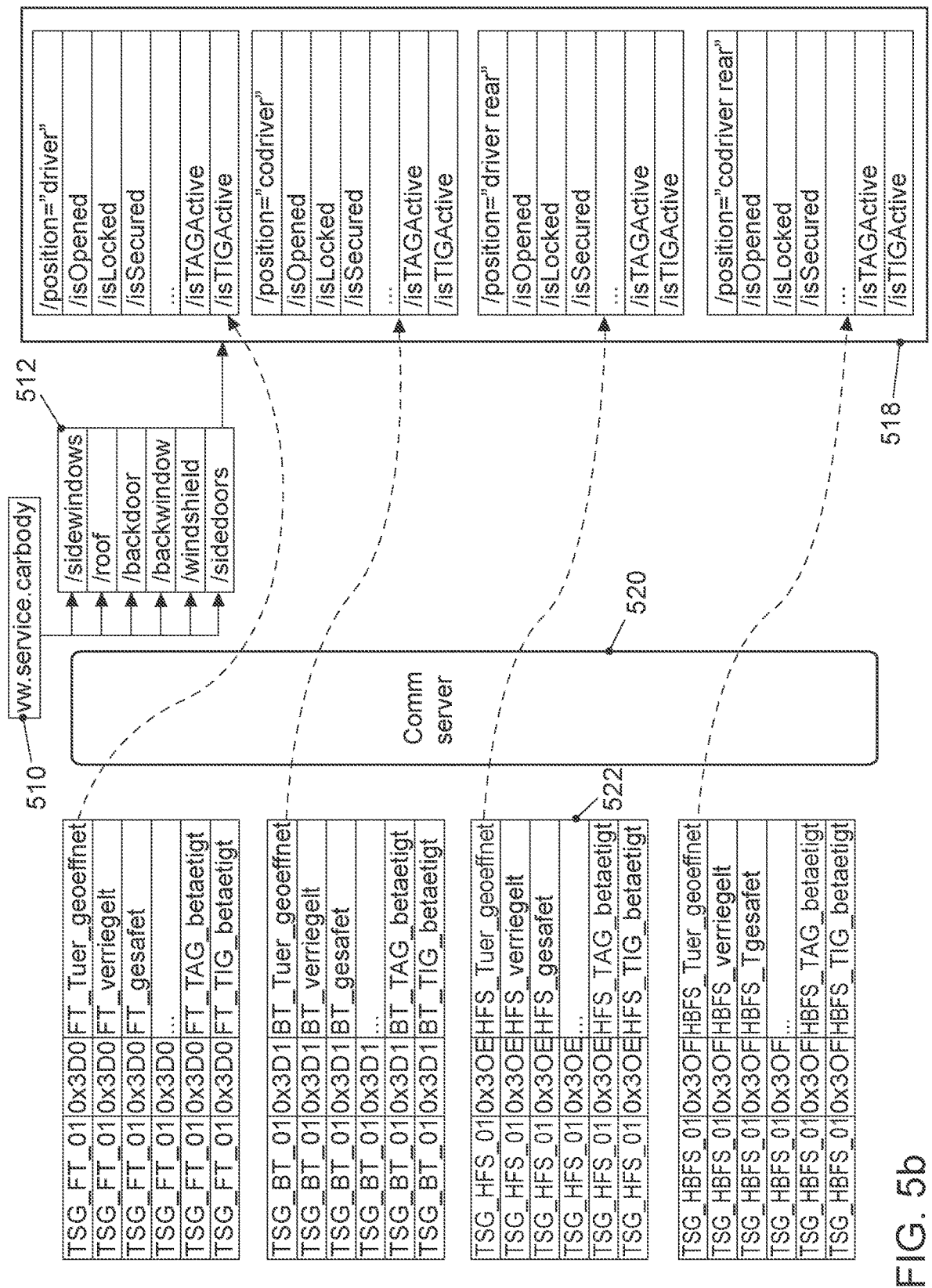

FIG. 5b shows an assignment between the service data model 518 from FIG. 5a to a signal data model 522 by a communication server 520. In this context, the communication server is designed to assign signal data for the signal sources TSG_FT_01 (driver door), TSG_BT_01 (passenger door), TSG_HFS_01 (door behind the driver) and TSG_HBFS_01 (door behind the passenger) with the particular data having the suffixes _Tuer_geoeffnet, _verriegelt, _gesafet, _TAG_betaetigt, _TIG_betaetigt to the corresponding service data of the service data model.

Various signal types will be presented below. A distinction is made between the following signal types:

Type 0 ("1 bit"): The signal has a length of a 1 bit initialization value ("init value"), and is one of the two possible values (normally 0)

Type 1 ("purely logical"): The signal has only logical values+init value

Type 2 ("logical with error"): The signal has only logical values+init value+error value Type 3 ("purely physical"): The signal has only physical values+init value Type 4 ("physical with error") the signal has only physical values+init value+error value Type 5 ("logical and physical") the signal has physical and logical values+init value+error value Type 6 ("constant signal"): The signal has logical values. In a vehicle, one of the logical values in the signal is constant→subset of type 1

These signal types are transformed in at least some exemplary embodiments (a conversion between the at least one first data format and the at least one second data format) into the service data module as follows. In the following, the reference numerals designate:

530 a designator of a service
532 a version number of the service
534 an identifier of the service
536 a designator of a resource of the service
538 an identifier of the resource
540 a property of the resource
542 a data type of the property
544 the value of the property With type 0 ("1 bit"), the signal is mapped to a property of the Boolean type. FIG. 5c shows an example in which it is given the service ExteriorLight, the resource "lightFunctions" with the properties "id" (identifier) of data type "uuid" (universally unique identifier), "functionIdentifier" of data type "enum" and the value "1—ParkingLights" and "isActivated" of the "Boolean" data type and with the value (object) "LV_Standlicht_Anzeige".

With type 1a ("purely logical"), the signal only has logical values and an (implied) init value. This represents a mapping of the signal to a property of the "integer" type, as shown in FIG. 5d. There, the service "EmergencyAssist" has the resource "notifications" with the properties "id" (identifier) of the data type "uuid", the "type" of data type "enum" and the value "1—EmergencyAssistNotification", as well as the "value" of the data type "integer" with the value "EA_Texte" (emergency assistance texts). The received signal value is provided in the "property value". Constant signals (without an init value) can also still be served with the last value even when the source fails.

With type 1b ("purely logical"), the signal only has logical values and an (implied) init value. This represents a mapping of the signal to a property of the 'integer" type. The property "valueType" of the type "enum" indicates whether an initialization value is present. FIG. 5e shows an example of the service "EmergencyAssist" with the resource "notifications" with the properties "id" of the data type "uuid", the "type" of data type "enum" and the value "1—EmergencyAssistNotification", the "value" of the data type "integer" with the value "EA_Texte" as well as the "valueType" of the data type "enum [0=init, 1=error, 2=logicalValue, 3=physicalValue]" with the value "EA_Texte". The received signal value is provided in the property value. When the "init" value is received, this is provided in "value", and "valueType" is set to "0".

With type 2 ("logical with error"), the signal only has logical values, an init value, and an error value. In this case, the signal is mapped to a property of the "integer" type. The property "valueType" of the type "enum" indicates whether an init, error or valid value is present. FIG. 5f shows an example of the service "EmergencyAssist" with the resource "notifications" with the properties "id" of the data type "uuid", the "type" of data type "enum" and the value "1—EmergencyAssistNotification", the "value" of the data type "integer" with the value "EA_Texte" as well as the "valueType" of the data type "enum [0=init, 1=error, 2=logicalValue, 3=physicalValue]" with the value "EA_Texte". The received signal value is provided as the "value" property. When the init or error value is received, this is provided in "value", and "valueType" is set to "0", or respectively "1". When a second valid value is received, "valueType" is set to "2=logicalValue".

With type 3 ("purely physical"), the signal only has physical values and an init value; with type 4, it also has an error value. This represents a mapping of the signal to a property of the "integer" or "double" type. The property "valueType" of the type "enum" indicates whether an init or valid value is present. FIG. 5g shows an example of the service "Odometrie V2" with the resource "velocities" with the properties "id" (identifier) of the data type "uuid", the "type" of the data type "enum" and the value "1—VelocityNCAP" (velocity new car assessment program), the "value" of the data type "double" with the value "EML_AnzeigeGeschw" as well as the "valueType" of the data type "enum [0=init, 1=error, 2=logicalValue, 3=physicalValue]" with the value "EML_AnzeigeGeschw". The received signal value is provided as the "value" property. When the init or error value is received, this is provided in "value", and "valueType" is set to "0", or respectively "1". When a valid value is received, "valueType" is set to "3=physicalValue".

Figures 5H, 6:
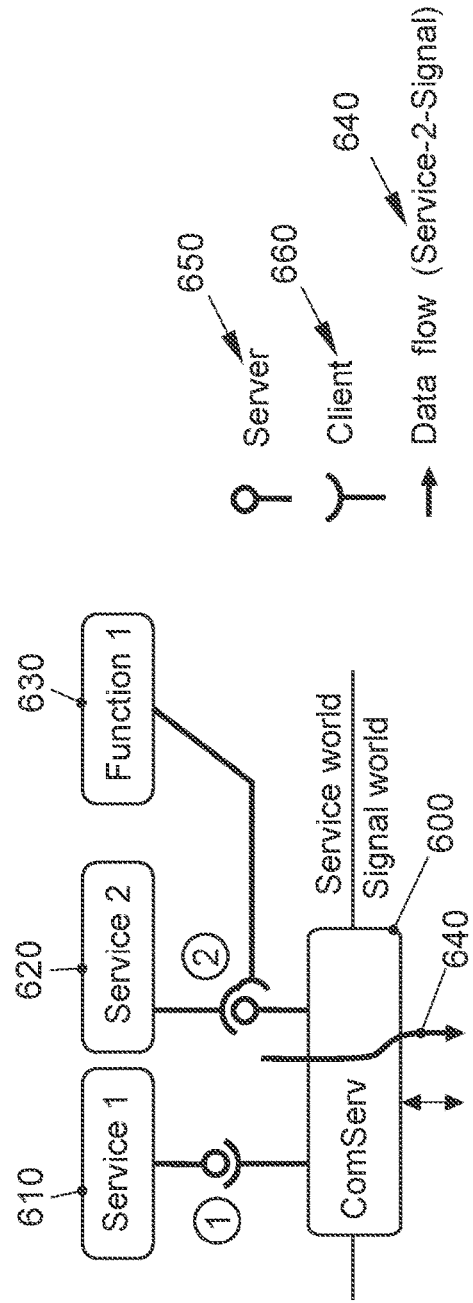

With type 5 ("logical and physical"), the signal has physical and logical values, an init value, and an error value. The signal is mapped to a property of the "integer" or "double" type for physical values, and mapped to a property of the "integer" type for logical values. The property "valueType" of the type "enum" indicates whether an init, error, physical or logical value is present. FIG. 5h shows an example of the service "Odometrie V2" with the resource "velocities" with the properties "id" of the data type "uuid", the "type" of the data type "enum" and the value "1—VelocityNCAP", the "physicalValue" of the data type "double" with the value "EML_AnzeigeGeschw", the "logicalValue" of the data type "integer", and the value "EML_AnzeigeGeschw" as well as the "valueType" of the data type "enum [0=init, 1=error, 2=logicalValue, 3=physicalValue]" with the value "EML_AnzeigeGeschw". The received physical value is provided in the property "physicalValue" (transformed raw value) and in the property "logicalValue" (raw value). "valueType" is set corresponding to the received value.

In at least some exemplary embodiments, the communication server (such as the data switching device) is a service-to-signal transformer. Accordingly, data such as from a participant from the service world (such as from the second plurality of vehicle components) may be sent to the signal world.

FIG. 6 shows a schematic diagram of such a communication. A communication server 600 provides a service-to-signal transformer (such as the communication interface). This enables the transformation of a data flow 640 from the service world to the signal world. In this context, the communication server 600 may serve both as a server 650 as well as a client 660 in the communication with services 610; 620 or functions 630. Accordingly, the communication server is for example a client of service 1 610 and a server for service 2 620 and function 1 630.

The following two transformation versions may be provided by the communication server (such as via the communication interface):

Version 1 ("communication server picks up"): the communication server is the client, and the service is the server Version 2 ("cyclical set"): the communication server is the server, and the service is the client In version 1 as shown in FIG. 6, Service1 610 is the server, and the communication server 600 is the client. With Service1, the communication server subscribes to changes of the corresponding services/resources/properties (that contain the signal value to be written). As long as Service1 is available, the communication server writes the currently available value to the signal world.

In version 2 as also shown in FIG. 6, Service2 620 is the client, and the communication server 600 is the server. Service2 calls the "Set" method from the communication server in order to write a signal value to the signal world. As long as there is a new call of the "Set" function during the time Ttimeout, ComServ writes the currently available value to the signal world.

More details and aspects of the communication server will be mentioned in conjunction with the approach or examples that were described above (such as FIG. 1a to 2b). The communication server may include one or more additional optional features which correspond to one or more aspects of the proposed approach or the described examples as described above or below.

Another exemplary embodiment is a computer program for performing at least one of the above-described methods, if the computer program runs on a computer, a processor, or a programmable hardware component. Another exemplary embodiment is also a digital storage medium that is machine or computer-readable, and that has electronically-readable control signals which can interact with a programmable hardware component so that one of the above-described methods is executed.

The features disclosed in the above description, the following claims and the accompanying FIGS. may be relevant and implemented in their different configurations both individually as well as in any combination to realize an exemplary embodiment.

Although many aspects were described in conjunction with a device, it is understood that these aspects also represent a description of the corresponding method so that a block or a component of a device is also to be understood as a corresponding method step or as a feature of a method step. Analogously, aspects that were described in conjunction with or as a method step, also represent a description of a corresponding block or detail or feature of a corresponding device.

Depending on specific implementation requirements, exemplary embodiments may be implemented in hardware or in software. The implementation may be performed using a digital storage medium such as a floppy disk, DVD, Blu-ray disc, CD, ROM, PROM, EPROM, EEPROM or flash memory, hard disk, or another magnetic or optical memory on which electronically-readable control signals are saved that interact or may interact with a programmable hardware component so that the respective method is performed.

A programmable hardware component may be formed by a processor, a computer processor (CPU=central processing unit), a graphics processor (GPU=graphics processing unit), a computer, a computer system, an application-specific integrated circuit (ASIC), an integrated circuit (IC), a single chip system (SOC=system-on-a-chip), a programmable logic element or a field-programmable gate array with a microprocessor (FPGA=field-programmable gate array).

The digital storage medium may therefore be machine or computer-readable. Several exemplary embodiments therefore include a data carrier that has electronically-readable control signals which are capable of interacting with a programmable computer system or a programmable hardware component such that one of the methods described herein is performed. An exemplary embodiment is accordingly a data carrier (or a digital storage medium or a computer-readable medium) on which the program for performing one of the methods described herein is recorded.

In general, exemplary embodiments may be implemented as a program, firmware, computer program or computer program product with a program code or as data, wherein the program code or the data is, or respectively are effective in performing one of the methods when the program runs on a processor or a programmable hardware component. The program code or the data may for example also be saved on a machine-readable carrier or data carrier. The program code or the data may inter alia exist as source code, machine code or byte code as well as another intermediate code.

Another exemplary embodiment is furthermore a stream of data, a signal sequence, or a sequence of signals that represents, or respectively represent, the program for performing one of the methods described herein. The stream of data, the signal sequence or the sequence of signals may for example be configured in order to be transferred via a data communication link, such as via the Internet or another network. Exemplary embodiments are accordingly also signal sequences representing data that are suitable for being transmitted via a network or a data communication link, wherein the data represent the program.

A program according to one exemplary embodiment may for example implement one of the methods while it is being performed in that it reads out memory areas, or writes a datum or several data to them, whereby possibly switching processes or other processes are evoked in transistor structures, in amplifier structures or in other components which are electrical, optical or magnetic or which function according to another functional principle. Correspondingly, by reading out a memory area, data, values, sensor values, or other data can be recorded, determined or measured by a program. A program can therefore record, determine or measure quantities, values, measurands and other information by reading out one or more memory areas, and can cause, induce or perform an action by writing to one or several memory areas, or control other units, machines and components.

The above-described exemplary embodiments merely represent an illustration of the principles of the present invention. It is understood that modifications and variations of the arrangements and details described herein are apparent to other persons skilled in the art. It is therefore intended that the invention is only restricted by the scope of protection of the following claims, and not by the specific details which were presented herein with reference to the description and the explanation of the exemplary embodiments.

LIST OF REFERENCE NUMERALS

10 Data switching device
12 Interface
14 Control module
20 Device
22 Interface
24 Control module
30 First plurality of vehicle components
40 Second plurality of vehicle components
100 Vehicle
110 Communication with a first plurality of vehicle components
120 Communication with a second plurality of vehicle components
130 Providing of a communication interface
210 Communication with a data switching device
220 Using of the data switching device
302 Vehicle applications
304 Vehicle sensors/actuators
306 Communication server
310 Server module
312 Service communication interface
314 First stage: Sorting
316 Data tank 320 Signal technology plug-in
322 Stage 2: Transformation
324 Stage 1: Filtering
326 Signal communication interface
330 Communication server
332 Signal communication interface
334 Syntactic transformation
336 Service communication interface
338 End-to-end securing
340 Semantic transformation
350 Service enhancer
400 Communication server
410 Signal-to-service transformer
420 Service 1
422 Function 1
430 Service 2
440 Service 4
512 Service
514 Resources
516 Object description
518 Instances of the object
520 Communication server
522 Signal data model
530 Designator of a service
532 Version number of the service
534 Identifier of the service
536 Designator of a resource of the service
538 Identifier of the resource
540 Property of the resource
542 Data type of the property
544 Value of the property
600 Communication server
610 Service 1
620 Service 2
630 Function 1
640 Data flow
650 Server
660 Client The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfill the functions of several items recited in the claims.

The term "exemplary" used throughout the specification means "serving as an example, instance, or exemplification" and does not mean "preferred" or "having advantages" over other embodiments.

The mere fact that certain measures are recited in mutually different dependent claims or embodiments does not indicate that a combination of these measures cannot be used to advantage. Any reference signs in the claims should not be construed as limiting the scope.

What is claimed is:

1. A data switching device for a vehicle, the data switching device comprising:
   at least one interface, connectable with a first plurality of vehicle components of the vehicle and with a second plurality of vehicle components of the vehicle; and
   a control circuit configured to communicate with the first plurality of vehicle components of the vehicle based on at least one first data format, and with the second plurality of vehicle components of the vehicle based on at least one second data format, which second data format differs from the first data format; wherein
   the control circuit is configured to allow communication between the first plurality of vehicle components and the second plurality of vehicle components
   by converting first data from the first plurality of vehicle components into second data for the second plurality of vehicle components; wherein
   the first data is based on the at least one first data format;
   the second data is based on the at least one second data format; and wherein
   the control circuit is configured to remove redundant information by determining at least a part of the second data based on redundant information of the first data.

2. The data switching device of claim 1, wherein the control circuit is configured to provide end-to-end secured communication between a first vehicle component of the first plurality of vehicle components and a second vehicle component of the second plurality of vehicle components.

3. The data switching device of claim 2, wherein the control circuit is configured to secure end-to-end secured communication by determining at least one transmission error, and/or forwarding data on the at least one transmission error.

4. The data switching device of claim 1, wherein the control circuit is configured to convert indications of errors in communication of the first plurality of vehicle components based on the first data format into the second data format, and to provide them to the second plurality of vehicle components,
   and wherein the control circuit is configured to convert indications of errors in communication of the second plurality of vehicle components based on the second data format into the first data format, and to provide them to the first plurality of vehicle components.

5. The data switching device of claim 1, wherein at least one vehicle component is included in the first plurality of vehicle components and in the second plurality of vehicle components.

6. The data switching device of claim 1, wherein the first plurality of vehicle components corresponds to a plurality of control units for actuating vehicle sensors and/or for actuating vehicle actuators,
   and/or wherein the second plurality of vehicle components comprises a plurality of computing units of the vehicle.

7. The data switching device of claim 1, wherein the control circuit is configured with a configuration datum, wherein the control circuit is furthermore configured to receive an updated configuration datum to refresh the configuration datum.

8. The data switching device of claim 1, wherein the control circuit is configured to continuously receive the first data of the first plurality of vehicle components from the first plurality of vehicle components in order to determine the second data based on the first data and provide them to the second plurality of vehicle components;
   and/or wherein the control circuit is configured to continuously receive the first data of the first plurality of vehicle components from the first plurality of vehicle components, wherein the control circuit is configured to determine a timeout for obtaining the first data of the first plurality of vehicle components.

9. The data switching device of claim 1, wherein the control circuit is configured to provide the second data via an object-oriented programming interface for the second plurality of vehicle components and/or wherein the second data format is an object-oriented data format.

10. The data switching device of claim 1, wherein the control circuit is configured to convert indications of errors in communication of the first plurality of vehicle components based on the first data format into the second data format, and to provide them to the second plurality of vehicle components.

11. The data switching device of claim 1, wherein the control circuit is configured to convert indications of errors in communication of the second plurality of vehicle components based on the second data format into the first data format, and to provide them to the first plurality of vehicle components.

12. A road vehicle with a data switching device and at least one first vehicle component and at least one second vehicle component, the data switching device comprising:
at least one interface, connected with the at least one first vehicle component and with the at least one second vehicle component; and
a control circuit configured to communicate with the at least one first vehicle component based on at least one first data format, and with the at least one second vehicle component based on at least one second data format, which second data format differs from the first data format; wherein
the control circuit is configured to allow communication between the at least one first vehicle component and the at least one second vehicle component by converting first data from the first vehicle component into second data for the second vehicle component; wherein the first data is based on the at least one first data format; the second data is based on the at least one second data format; and wherein
the control circuit is configured to remove redundant information by determining at
least a part of the second data based on redundant information of the first data.

13. A data switching method for a vehicle, the data switching method comprising:
receiving first data from a first vehicle component of the vehicle, which first data is based on at least one first data format;
converting the first data into second data, which second data is based on at least one second data format, different from said first data format;
removing redundant information by determining at least a part of the second data based on redundant information of the first data; and
transmitting the second data to at least a second vehicle component of the vehicle.

14. A non-transitory medium having program code for performing at least the method of claim 13 when the program code is executed on a computer, a processor, a controller, or a programmable hardware component.

* * * * *